UNITED STATES PATENT OFFICE.

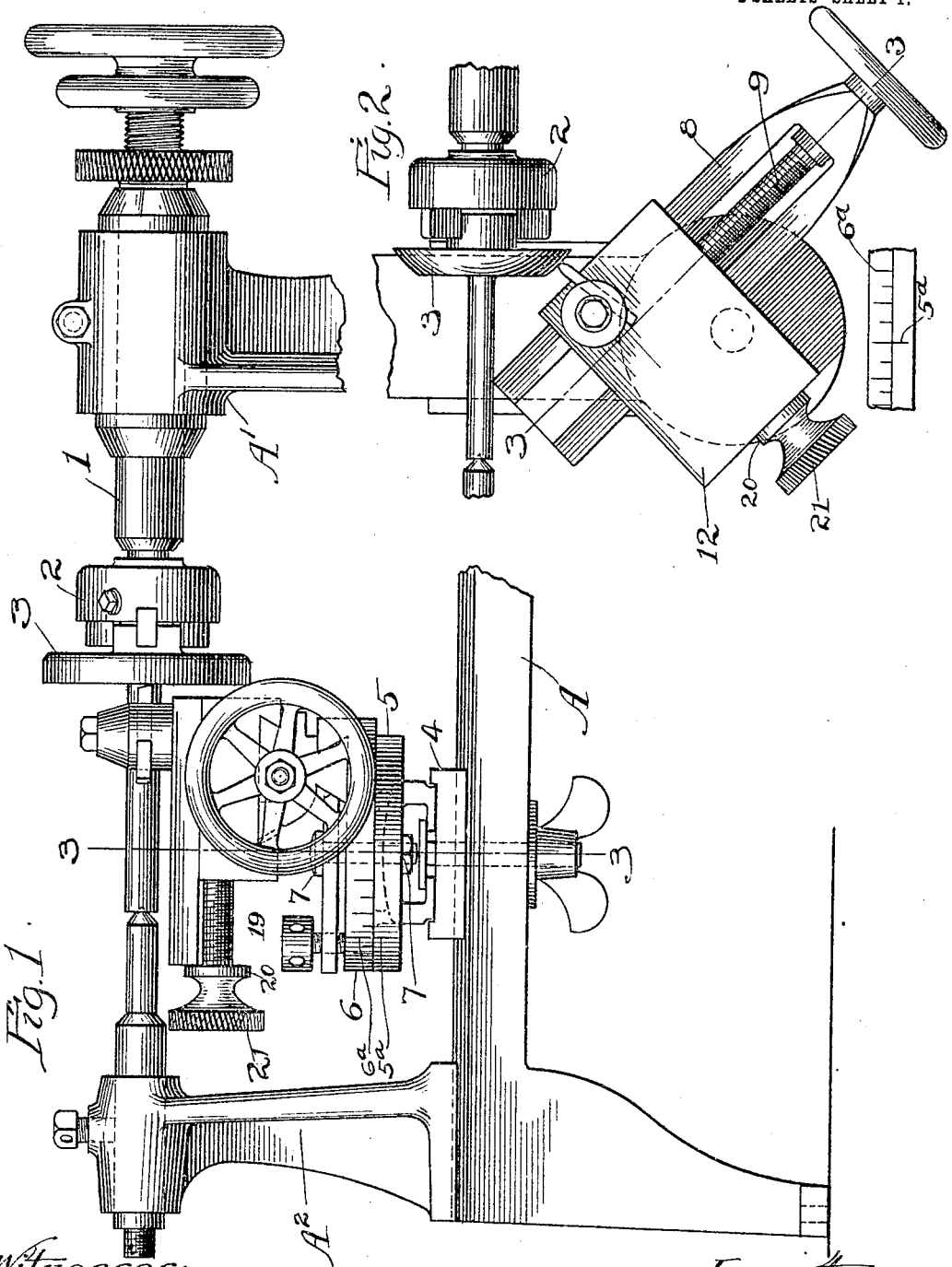

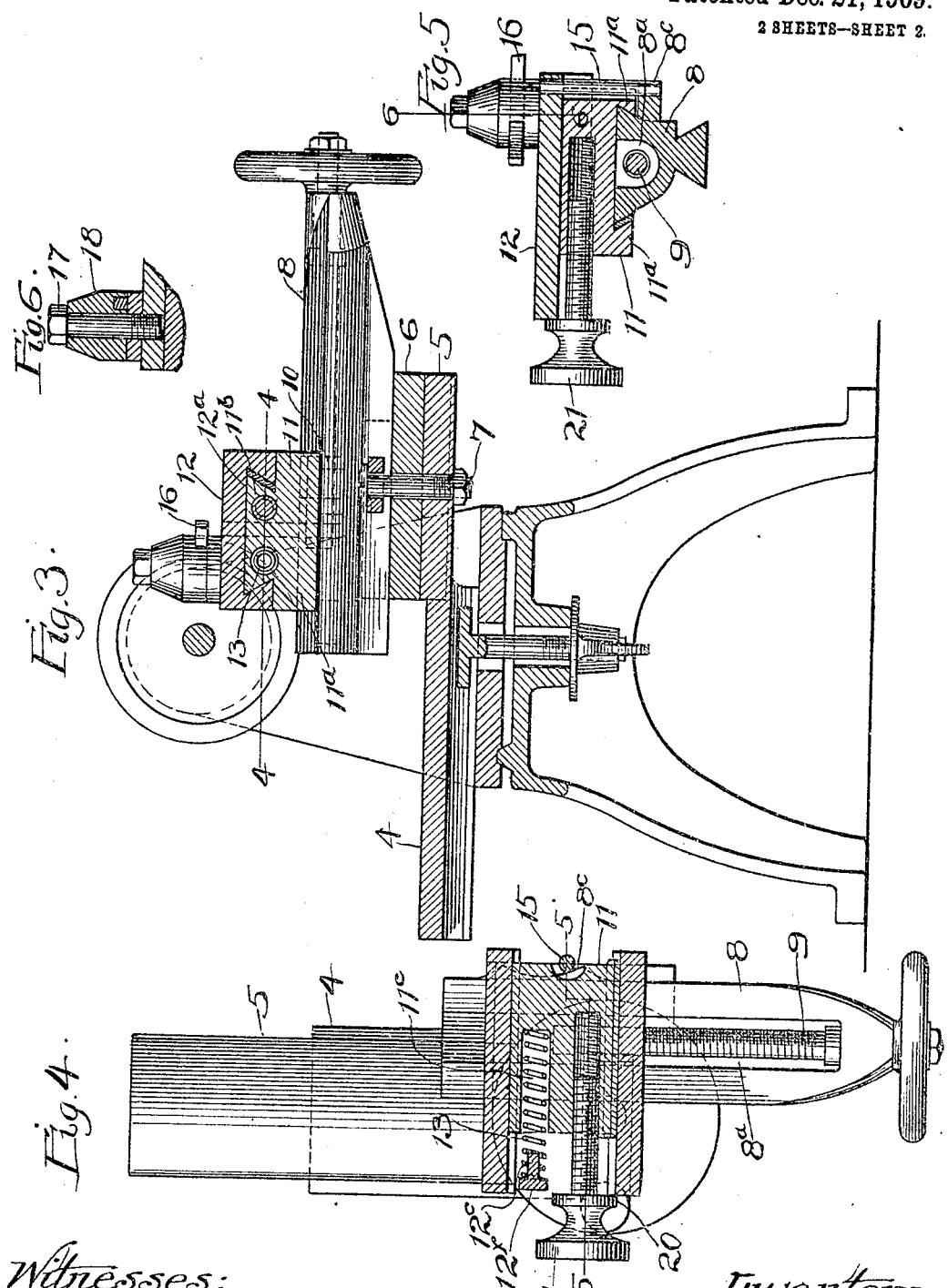

FRANK L. SMITH, OF CHICAGO, ILLINOIS, AND THOMAS B. WILLIAMS, OF ORANGE, MASSACHUSETTS, ASSIGNORS TO THE LEAVITT MACHINE COMPANY, OF ORANGE, MASSACHUSETTS, A CORPORATION OF MASSACHUSETTS.

VALVE-DISK-CUTTING MACHINE.

944,002.     Specification of Letters Patent.      Patented Dec. 21, 1909.

Application filed December 12, 1908. Serial No. 467,306.

*To all whom it may concern:*

Be it known that we, FRANK L. SMITH and THOMAS B. WILLIAMS, citizens of the United States, residing, respectively, at Chicago, in the county of Cook and State of Illinois, and at Orange, in the county of Franklin and State of Massachusetts, have invented new and useful Improvements in Valve-Disk-Cutting Machines, of which the following is a specification, reference being had to the accompanying drawings, forming a part thereof.

This invention is designed as an improvement upon machines for cutting or redressing such devices as valve disks for which a portable machine adapted to be operated by hand is desirable.

It consists in the features of construction shown and described as indicated in the claims.

In the drawings:—Figure 1 is a front elevation of a machine embodying this invention. Fig. 2 is a detail plan view of a portion of the machine in which the specific features of the invention are contained showing the tool holder adjusted for travel of the tool oblique to the axis of the work holder. Fig. 3 is a section at the line 3—3 on Fig. 2 as to the tool-holder, and directly transverse to the axis of the work holder as to the standard or supporting frame. Fig. 4 is a section at the line 4—4 on Fig. 3. Fig. 5 is a section at the line 5—5 on Fig. 4. Fig. 6 is a detail section at the line 6—6 on Fig. 5.

The machine illustrated in the drawings is represented as mounted on a base, A, comprising on such base the work-holder head, A¹, and tail stock, A². The work holder head has journaled in it a rotatable workholder shaft, 1. It is illustrated as provided with means for adjusting and rotating it which need not be particularly described, being substantially the same as those which are shown in patent to Frank L. Smith, No. 859,528, dated July 9, 1907. The shaft, 1, is represented as carrying a chuck, 2, in which the work, consisting of the valve disk, 3, is mounted.

On the bed of the base frame, A, there is mounted for adjustment longitudinally thereof and parallel to the axis of the work holder the tool carriage which comprises the slide, 4, resting directly upon the slideways of the bed, A, and having mounted upon it for sliding transversely of the bed a two-part base carriage which consists of a lower member, 5, and an upper member, 6, connected together by a vertical pivot bolt, 7, the upper member, 6, being rotatable about said pivot for angularly adjusting the tool propeller bearing for effecting angular adjustment of the tool path with respect to the axis of the work holder. The members, 5 and 6, have graduated elements, 5ª and 6ª, respectively, cylindrical about the pivotal axis of the two members, their graduation being designed and adapted for indicating the angular adjustment which may be made about their vertical pivot. Upon the upper member, 6, of said two-part base carriage there is rigidly mounted and preferably formed integrally the tool carrier, 8, in which there is journaled and longitudinally stopped the feed screw or propeller shaft, 9, which is reached through the longitudinal slot, 8ª, of said carrier and engaged by the depending threaded lug, 10, of a traveler, 11, mounted for sliding and guidance in its travel along the carrier, 8, which is embraced to afford such guidance by the depending flanges, 11ª, of said traveler. On the traveler there is mounted for sliding transversely with respect to the travel of the latter the tool holder, 12, whose engagement with the traveler is by means of a dove-tailed groove in the under side of the carrier and a reciprocal dove-tailed rib, 11ᵇ, projecting from the upper side of the traveler, said dove-tailed rib extending for only part of the length of the traveler, stopping short of the back end thereof,—that is, the end opposite that at which the tool projects toward the work. Into the dove-tailed groove, 12ª, of the tool holder a lug, 12ᶠ, projects downward from the overhanging wall of the groove, said lug having a pintle, 12ᵉ, projecting from its wing for centering a spring, 13, which extends from the lug into a pocket, 11ᶜ, in the dove-tailed rib, 11ᵇ, of the traveler, such spring reacting between the traveler and the holder for retracting the tool-carrying end of the tool holder back from the work. On the side of the tool carrier, 8, toward the work there is formed a cam, 8ᶜ, which, for the particular purpose of dressing valve disks is concave toward the work as illustrated. A stud, 15, projects rigidly downward from the tool holder, 12, past the operating face of the cam in position for stopping against said face and riding therealong as the traveler, 11, is propelled along the holder, 8, the spring, 13, operating to hold said stud against the cam face so that the contour of the cam will control the deflection of the tool from a straight course as it is carried by the traveler when the latter is propelled along the holder by the propeller or feed screw, 9. The tool, 16, is mounted and clamped on the tool holder, 12, by means of a clamp bolt, 17, screwed into the holder and a clamp sleeve, 18, under the head of the bolt slotted at its lower face to receive the tool which can be adjusted as to its angle to the work and clamped as thus adjusted by the bolt, 17. It will be observed that the construction described causes the cutting point of the tool mounted as shown in Fig. 3 to traverse the work in a curved path whose curvature is controlled by and conformed to that of the cam, $8^c$, thereby giving the disk convexity reciprocal to the concavity of the cam face. Obviously, a reversal of the curvature of the cam would effect corresponding reversal of the curve of the disk if such reversely curved disk were at any time desired. For cutting flat or cylindrical or conical disks the path of the tool should be straight and not curved, and for that purpose provision is made for adjusting the holder, 12, and holding it positively at a position at which the stud, 15, is entirely clear of the cam. This means consists of a screw, 19, engaging the dove-tailed rib, $11^b$, and having a broad shoulder, 20, impinging against the outer or rear end of the traveler, 11, as seen clearly in Fig. 4. By operating this screw by means of its head, 21, the holder, 12, is forced toward the work until the stud, 15, is at a position such that its path when the traveler is propelled by the feed screw, 9, is clear of the highest or most protruded point of the cam, $8^c$, which results in giving the tool a rectilinear path over the face of the work.

We claim:—

1. In a machine of the character indicated, in combination with a rotatable work holder, a tool carrier; a traveler and means for propelling it along the tool carrier; a tool holder mounted for sliding on the traveler transversely of its travel on the carrier; a spring reacting between the holder and the traveler to retract the holder from the work; a cam on the carrier and an abutment on the holder which is held against the cam by such retracting spring.

2. In a machine of the character indicated, in combination with a rotatable work holder, a tool carrier; a traveler and means for propelling it along the tool carrier; a tool holder mounted for sliding on the traveler transversely of its travel on the carrier; a spring reacting between the holder and the traveler to retract the holder from the work; a cam on the carrier and an abutment on the holder which is held toward the cam by such retracting spring; means for forcing the holder in its slide-way on the traveler in opposition to the spring to carry the abutment out of range of the cam.

3. In a machine of the character indicated, in combination with a rotatable work holder, a tool carrier; a traveler and means for propelling it along the tool carrier; a tool holder mounted for sliding on the traveler transversely of its travel on the carrier; a spring reacting between the holder and the traveler to retract the holder from the work; a cam on the carrier and an abutment on the holder which is held toward the cam by such retracting spring; a screw engaging the traveler and having a shoulder impinging against the rear of the holder for forcing the holder in its slide-way on the traveler in opposition to the spring to carry the abutment out of range of the cam.

4. In a machine of the character indicated, in combination with a rotatable work holder; a tool holder base mounted for adjustment transversely of the work holder axis; a tool carrier mounted on the base for adjustment angularly with respect to such axis; a traveler and means for propelling it along the tool carrier; a tool holder mounted for sliding on the traveler transversely of its travel on the carrier; means operating on the holder to retract it yieldingly along the traveler from the work, and coöperating means on the carrier and holder for resisting such retraction and forcing the holder in the opposite direction.

5. In a machine of the character indicated, in combination with a rotatable work holder, a tool carrier mounted for angular adjustment with respect to the axis of the work holder; a traveler and means for propelling it along the tool carrier; a tool holder mounted for sliding on the traveler transversely of its travel on the carrier; means operating on the holder to yieldingly retract it along the traveler away from the work, and coöperating devices on the carrier and holder for resisting such retraction and forcing the holder in the opposite direction by the movement of the traveler on the carrier.

6. In a machine of the character indicated, in combination with a rotatable work holder, a tool carrier base mounted for adjustment transversely of the work holder axis; a tool carrier mounted on the base for adjustment angularly with respect to such axis; a traveler and means for propelling it along the tool carrier; a tool holder mounted for sliding on the traveler transversely of its travel on the carrier; means operating on the holder to retract it yieldingly along the traveler from the work; a cam on the carrier, and an abutment on the holder which is held against the cam by such retracting means.

7. In a machine of the character indicated, in combination with a rotatable work holder, a tool carrier mounted for angular adjustment with respect to the axis of the work holder; a traveler and means for propelling it along the tool carrier; a tool holder mounted for sliding on the traveler transversely of its travel on the carrier; means operating on the holder to retract it yieldingly along the traveler from the work; a cam on the carrier, and an abutment on the holder which is held against the cam by such retracting means.

In testimony whereof, we, FRANK L. SMITH and THOMAS B. WILLIAMS, have hereunto set our hands, respectively, at Chicago, Illinois, this 30th day of November, 1908, and at Orange, Massachusetts, this 4th day of December, 1908.

FRANK L. SMITH.
THOMAS B. WILLIAMS.

Witnesses for Frank L. Smith:
M. GERTRUDE ADY,
JULIA S. ABBOTT.

Witnesses for Thos. B. Williams:
JAMES D. KIMBALL,
FRED A. DEXTER.